United States Patent
Mauri Lopez (10) Patent No.: US 9,997,896 B2
(45) Date of Patent: Jun. 12, 2018

(54) BY-PASS SYSTEMS FOR OVERHEAD POWER LINES

(75) Inventor: Manuel Mauri Lopez, Milan (IT)

(73) Assignee: PRYSMIAN S.p.A., Milan (IT)

( * ) Notice: Subject to any disclaimer, the term of this patent is extended or adjusted under 35 U.S.C. 154(b) by 68 days.

(21) Appl. No.: 14/405,018

(22) PCT Filed: Jun. 6, 2012

(86) PCT No.: PCT/EP2012/060660
§ 371 (c)(1),
(2), (4) Date: Dec. 2, 2014

(87) PCT Pub. No.: WO2013/182235
PCT Pub. Date: Dec. 12, 2013

(65) Prior Publication Data
US 2015/0129274 A1    May 14, 2015

(51) Int. Cl.
*H02B 1/52*    (2006.01)
*H02G 1/02*    (2006.01)
*H02G 1/04*    (2006.01)

(52) U.S. Cl.
CPC ............... *H02B 1/52* (2013.01); *H02G 1/02* (2013.01); *H02G 1/04* (2013.01)

(58) Field of Classification Search
CPC .................................. H02G 1/02; H02B 1/52
See application file for complete search history.

(56) References Cited

U.S. PATENT DOCUMENTS

| 2,237,812 A | 4/1941 | De Blieux | |
| 2,551,841 A * | 5/1951 | Kepple | H02B 1/52 200/48 R |

(Continued)

FOREIGN PATENT DOCUMENTS

| DE | 10209658 A1 | 10/2003 |
| EP | 0774814 A2 | 5/1997 |

(Continued)

OTHER PUBLICATIONS

International Search Report PCT/ISA/210 for International Application No. PCT/EP2012/060660 dated Feb. 21, 2013.

(Continued)

*Primary Examiner* — William H Mayo, III
*Assistant Examiner* — Hiram E Gonzalez
(74) *Attorney, Agent, or Firm* — MH2 Technology Law Group, LLP (57) ABSTRACT

A by-pass system for overhead power lines may include: a housing; a bearing frame in the housing; an outdoor termination linked to the bearing frame; and/or an electrical cable electrically connected to the outdoor termination. The bearing frame may be configured to move between a stand-by position of the outdoor termination and an operating position of the outdoor termination. A by-pass system for overhead power lines may include: a housing; a bearing frame connected to the housing; an outdoor termination connected to the bearing frame; and/or an electrical cable electrically connected to the outdoor termination. The bearing frame may be configured to move between a stand-by position of the outdoor termination and an operating position of the outdoor termination.

17 Claims, 6 Drawing Sheets

(56) References Cited

U.S. PATENT DOCUMENTS

| | | | | |
|---|---|---|---|---|
| 4,367,512 A * | 1/1983 | Fujita | .................... | H01F 27/002 |
| | | | | 361/602 |
| 4,427,898 A * | 1/1984 | Miyake | .................. | H02G 13/80 |
| | | | | 307/9.1 |
| 4,535,253 A * | 8/1985 | Ootsuka | ................... | H02B 1/52 |
| | | | | 307/9.1 |
| 4,562,360 A | 12/1985 | Fujimoto | | |
| 6,586,697 B1 * | 7/2003 | Enns | ........................ | H02B 1/52 |
| | | | | 218/154 |
| 8,643,381 B2 * | 2/2014 | Werle | .................. | G01R 31/021 |
| | | | | 324/543 |
| 2009/0095522 A1 | 4/2009 | Barthold | | |

FOREIGN PATENT DOCUMENTS

| | | |
|---|---|---|
| FR | 2698737 A1 | 6/1994 |
| RU | 52276 U1 | 3/2006 |
| SU | 1713010 A1 | 2/1992 |
| WO | WO-95/15036 A1 | 6/1995 |

OTHER PUBLICATIONS

Written Opinion of the International Searching Authority PCT/ISA/237 for International Application No. PCT/EP2012/060660 dated Mar. 5, 2013.

"Extension Cables Ready to Keep the Energy Transmission Flowing Through in Any Situations", High & Extra High Voltage 63 to 225kV Stand-By Links, Silec Cable, Jan. 2006 pp. 1-19 <http://www.generalcable-fr.com/Portals/france/pdf/en/2151_HVSBL.pdf>.

* cited by examiner

BY-PASS SYSTEMS FOR OVERHEAD POWER LINES

CROSS-REFERENCE TO RELATED APPLICATION(S)

This application is a national stage entry from International Application No. PCT/EP2012/060660, filed on Jun. 6, 2012, in the Receiving Office of the European Patent Office ("EPO") and published as International Publication No. WO 2013/182235 A1, the entire contents of which are incorporated herein by reference.

FIELD OF THE INVENTION

The present invention relates to a by-pass system for overhead power lines.

BACKGROUND OF THE INVENTION

An overhead power line is an aerial electric power transmission line, comprising one or more bare electric conductors suspended by towers or pylons. Since most of the insulation is provided by air, overhead power lines are generally a convenient method of transmission for large quantities of electric energy and are therefore mainly used for carrying high voltage (HV) current (typically higher than 30-35 kV). The overhead power lines need towers for being supported and insulators for insulating the structure of the towers (typically lattice type steel towers) from each conductor of the overhead electric energy transmission line; the ends of the insulated cable are connected to the overhead power lines at the relevant terminal stations or substations by means of components, called terminations, suitable to provide the required transition from the bare conductor of the aerial line, insulated by air, to a cable, having a conductor covered by an insulation layer and an earthed electric screening.

Overhead power lines typically comprise substations as part of electrical generation, transmission, and distribution system. For example, substations transform voltage from high to low, or the reverse, connect the overhead power lines to cabled lines, or perform any of several other functions of the electric network.

Ordinary and extraordinary maintenance need to be performed on overhead power lines, especially in the substations, for example when refurbishment and reconstruction of tower and overhead power lines occurs; when restoration or expansion in substations is required; when power transformers, circuit breakers, switchgears, shunts, or other components of a substation are to be replaced.

Such operations are performed by disconnecting all the components involved in the maintenance activity from the electric transmission line. Temporary by-pass systems which connect input and output points within the substations are used in order to guarantee the continuity of electric power supply to the users during the maintenance period. Typically, at least one of the ends of the by-pass system, or both of them, is connected to the overhead power line.

An example of by-pass system for overhead power lines is described in HVSBL January 2006 by Silec Cable (www.sileccable.com/Portals/france/pdf/en/2151_HVSBL.pdf).

According to this publication, a three phase High Voltage Stand-By Link (HVSBL) system is composed of three lengths of cable equipped with two synthetic terminations pre-mounted in factory; three dedicated drums allowing storage, transportation and unwinding and rewinding of the lengths equipped with their terminations; six metallic structures for supporting the terminations during use (optional).

The illustrated link systems are conditioned on dedicated metallic drums fitted out to contain and protect the cable equipped with its two terminations. A three phase link system may comprise one single drum of 2.6 m in diameter equipped with three compartments allowing to install on the same drum the three phases of a 90 kV HVSBL of 20 m, to three specific drums of 4.7 m each one containing one phase of a 225 kV HVSBL of 350 m. Generally, the terminations are installed in protections (tube or under-frame) positioned and fastened on the inner side of the drum (for transportation). Termination length increases with voltage and can be comprised between 1.8 m for 90 kV and 2.8 m for 225 kV. Drums delivered, laying equipment and routine tools are transported by truck from a storage yard to the installation site. A metallic structure supporting the terminations during operation can be a metallic structure allowing the mechanical support of a termination; each termination is lifted by a crane for being positioned on the top of a respective metallic structure and mechanically coupled thereto.

Typically, the installation procedure of temporary by-pass links for a three-phase power line comprises the following steps:

unloading three link-bearing drums from a truck, by means of a crane;

unwinding a cable length of each link from each drum and lay it down to the site of connection of the outdoor termination thereof;

providing the site of connection with a supporting structure for each outdoor termination of each link;

connecting each outdoor termination to the overhead power line and the other cable end to another power line.

Such a procedure takes a substantial amount of time (e.g. many work weeks, especially in case of termination for voltage higher than 200 kV), and this is a critical, especially in case of a line failure to be restored.

Due to the necessity of maintaining or repairing overhead power lines, by-passing certain positions or points of an electric energy transmission line is usually a mandatory operation to guarantee safe condition and to guarantee the electric power supply to the users.

The Applicant has observed that it would be advantageous to have short operating time for providing by-pass on electric energy transmission lines.

In particular, the Applicant has tackled the problem of providing a by-pass system for overhead power lines which requires shorter time and few staff for being installed in the field, compared with conventional ones.

SUMMARY OF THE INVENTION

The Applicant found that the above mentioned problems can be solved by a by-pass link system for AC high voltage electric lines comprising, for each phase, an outdoor termination, a cable length and a cable joint, pre-assembled and transportable to the site of connection with the overhead power line.

In particular, the Applicant has found that quick installation of a by-pass link system can be obtained by arranging an outdoor termination, a cable length and a cable joint on a supporting apparatus, movable from an idle position to an operating position and further acting as a bearing structure for supporting the outdoor termination in operation mode for the time during which the by-pass link is operated.

In one aspect, the present invention relates to a by-pass system for overhead power lines comprising
a housing;
a bearing frame in said housing,
an outdoor termination linked to the bearing frame, wherein said bearing frame is movable between a stand-by position and an operating position of the outdoor termination;
an electrical cable electrically connected to outdoor termination.

In a preferred embodiment the housing of the present by-pass is transportable. In particular, a transportable housing can be arranged on a vehicle or can be part of a vehicle.

In the stand-by position the outdoor termination is inside said housing, so that transportation can be enabled with reduced bulk, and extends at least partially outside said housing in operating position of the outdoor termination.

Preferably, said electrical cable is attached to the bearing frame for being moved integrally with said outdoor termination between the stand-by position and the operating position of the outdoor termination.

Preferably, said bearing frame is rotatable within the housing about an axis of rotation for moving from the stand-by position to the operating position.

Conveniently, typically for use for a three phase electrical line, three bearing frames are housed within the housing.

Preferably, at least two bearing frames are spaced lengthwise within the housing.

Preferably, three bearing frames are housed within the housing, and the relevant axes of rotation are at angle with each other in the vertical plane.

In a preferred embodiment, the bearing frame comprises a beam having a substantially curved shape, said outdoor termination is mechanically secured to a first end of said beam and said electrical cable is attached to said beam. Preferably, said bearing frame comprises a plurality of struts having first ends attached to said beam and second ends converging towards a hinge forming the axis of rotation of the bearing frame.

Preferably the by-pass system comprises a central bearing frame and two side bearing frames holding relevant outdoor terminations, arranged on opposite sides relative to the central bearing frame, in which the axis of rotation of the central bearing frame has a substantially horizontal lay and the axes of rotation of the side bearing frames are inclined relative to the axis of rotation of the central bearing frame, whereby the central bearing frame is rotatable in a first substantially vertical plane and the side bearing frames are rotatable in respective second and third planes, diverging upwise.

Preferably, a prefabricated cable joint is connected to the end of the electrical cable opposite to the end connected to the outdoor termination.

Advantageously, the cable joint provided at the second end of the electrical cable is of the type enabling quick connection to the electric network (plug-in connection).

Preferably, the housing holds an actuator operably connected with the bearing frame for causing the movement thereof between said stand-by position and said operating position of the outdoor termination.

More preferably, said actuator is a linear actuator, operating on an axis not intersecting the axis of rotation of the bearing frame.

In a second aspect the present invention relates to a method for operating a by-pass of a section of an electric line having an overhead end, which comprises:

providing a by-pass system including a bearing frame contained in a housing, with an outdoor termination linked to the bearing frame and an electrical cable electrically connected to said outdoor termination at an end thereof;

disposing said by-pass system in the proximity of said section of an electric line, while bearing frame is in a stand-by position;

moving said bearing frame in an operating position of the outdoor termination;

electrically connecting said outdoor termination to said overhead end of the electric line section.

Preferably, the method further comprises providing a prefabricated cable joint attached to an end of said electrical cable opposite to the end electrically connected to said outdoor termination and electrically connecting said prefabricated joint to an end of said section of an electric line opposite to said overhead end.

Within the present description, the term "transportable" means designed for being transferred from a place, for example a remote storage, to the place of operation.

The term "outdoor termination" as used herein refers to a component in which an end of an insulated electric cable is accommodated, having a connector for connection with an aerial electric line, connected with the cable conductor, and a insulation and screening structure suitable for providing insulation between the connector and the earth.

Within the present description, with "active position" or "operating position" it is meant a position in which the outdoor termination can be electrically connected to an overhead power line. In this position the termination is arranged for operating in the line, both from a mechanical and the electrical point of view.

Within the present description, with "stand-by position" it is meant a position in which the outdoor termination is housed and enveloped inside the housing for protection, storage and transportation.

Within the present description, as "electrical cable" is intended an insulated electrical cable, unless otherwise specified.

The bearing frames allow the electrical connection lines of the by-pass system as a whole, and the outdoor terminations in particular, to be easily and quickly placed in a condition ready for operation. This allows avoiding the need to perform a direct management of the outdoor terminations which require hauling and supporting means for being moved and transported as independent parts of a by-pass link.

The bearing frame allows the outdoor termination to be held in position for the electric connection without the need of mounting additional props or the like, as required by the known by-pass systems.

Preferably, the housing is associated with a plurality of wheels for road transportation.

More preferably, the housing is supported on a truck trailer.

Preferably, the housing comprises side walls, a top wall and a base wall, said walls forming a container enclosing the bearing frame and the electrical connection line when the bearing frame is in stand-by position.

Preferably, at least said top wall is at least partly removable to provide a top opening in the container.

Within the present description the term "horizontal" denotes a spatial orientation substantially parallel to the ground.

Preferably, the central bearing frame and the respective outdoor termination lie in a substantially vertical plane, the axis of rotation of the bearing frame being perpendicular to such vertical plane.

Within the present description the term "vertical" denotes a spatial orientation substantially perpendicular to the ground.

In the preferred embodiment of the invention the side bearing frames and the respective outdoor terminations lie in planes skewed relative to the vertical plane, the axes of rotation of the side bearing frames being perpendicular to the respective skewed plane.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein.

BRIEF DESCRIPTION OF THE DRAWINGS

The present invention will be now described more fully hereinafter with reference to the accompanying drawings.

DETAILED DESCRIPTION

With reference to the annexed figures, reference numeral 1 globally denotes a by-pass system for overhead power lines.

The by-pass system of the invention is adapted to be used for by-passing a section of an electrical line wherein at least one by-pass point is overhead. The by-pass system of the invention is preferably used on high and very high voltage electrical lines, wherein by high voltage it is meant a voltage in the range between 30 kV and 150 kV and by very high voltage it is meant a voltage higher than 150 kV.

The by-pass system 1 shown in the figures is an example for use on 220 kV voltage lines and the relevant substations.

Figure 1:
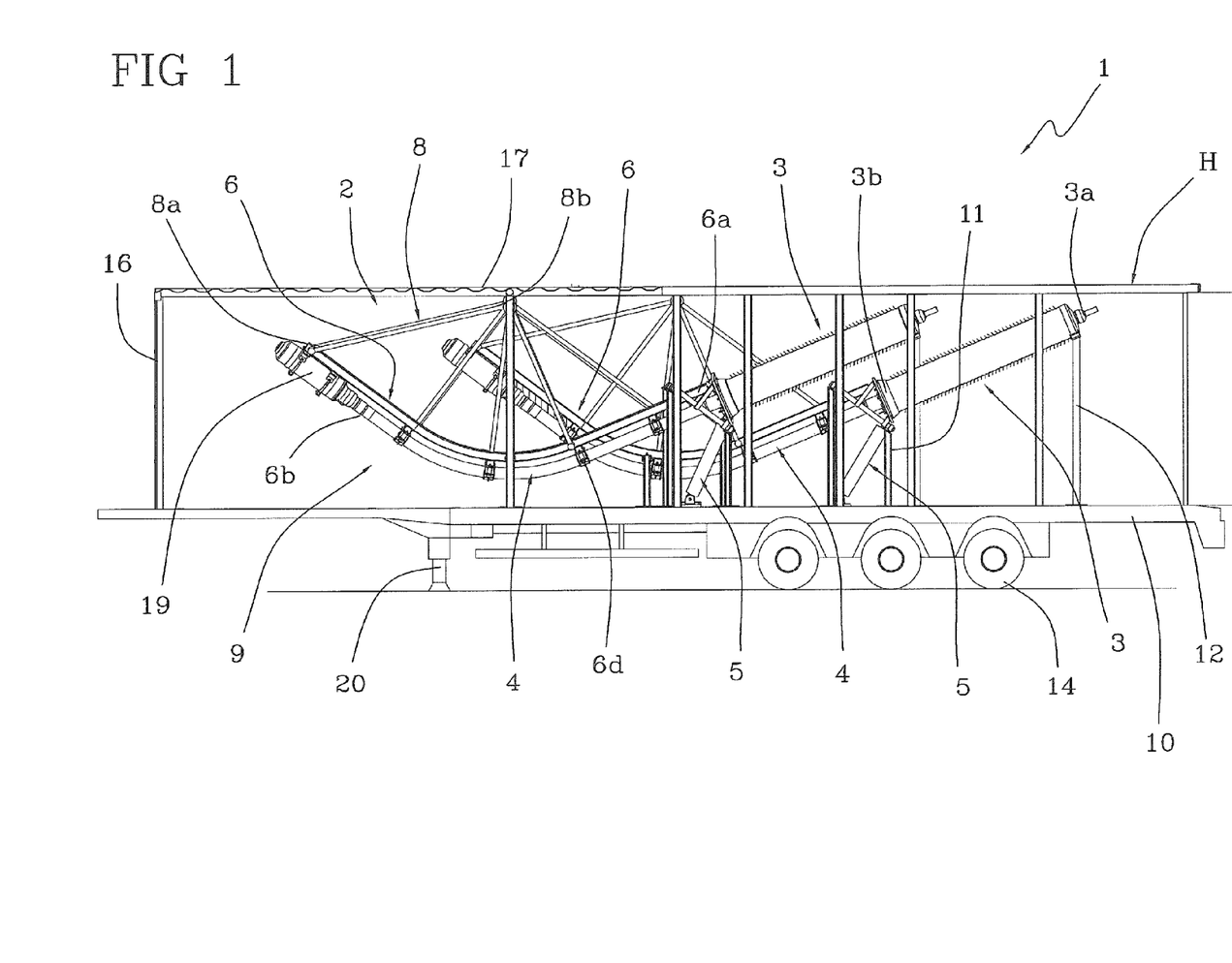
FIG. 1 is a schematic side view of a by-pass system for overhead power lines, according to an embodiment of the present invention, in a stand by position.
Figure 2:
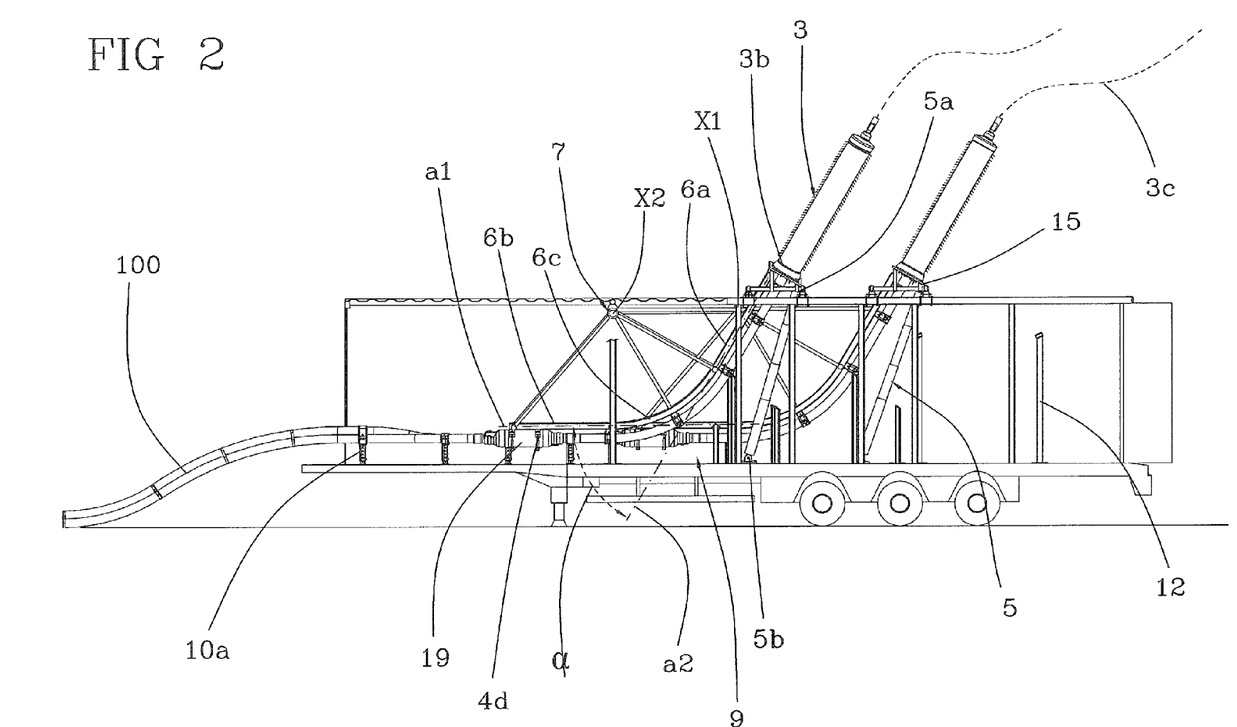
FIG. 2 is a schematic lateral view of the by-pass system for overhead power lines of FIG. 1 in an operating position.

The by-pass system comprises three bearing frames 2, arranged within a housing H, which are movable between a stand-by position (shown in FIG. 1) and an active or operating position (shown in FIG. 2).

An electrical connection line 9, comprising an electrical cable 4 and an outdoor termination 3 is supported by each bearing frame 2.

As shown in FIG. 2, the outdoor termination 3 is secured, at its bottom end 3b, to a baseplate 15 of the relevant bearing frame 2 and has its upper end 3a ready for being electrically connected to the overhead power line via an aerial conductor 3c when the by-pass system is in operating position.

The electrical cable 4 has its first end 4a electrically and mechanically connected to the outdoor termination 3. The second end 4b of the electrical cable 4 is ready for being connected to a cable 100 (FIGS. 2 and 3), for example an electrical cable intended to be electrically connected to the second by-pass point (as shall be better explained hereinafter).

The electrical cable 4 is attached to the relevant bearing frame 2 for being moved integrally with the outdoor termination 3 between the stand-by position and the operation position of the by-pass system 1.

The by-pass system 1 further comprises actuators 5 active on the relevant bearing frames 2 for moving the same between the stand-by position and the active position.

The actuators 5 are preferably linear actuators, such as hydraulic jacks, screw jacks or the like. Alternatively, other actuators can be used, such as gear type actuators or the like.

In a further alternative, the actuators can be missing and, in such case, the bearing frames 2 are moved in operating position by means of an external apparatus, such as a crane or the like.

The bearing frames 2 comprise a beam 6 having a substantially curved shape. In particular, the beam 6 has two substantially rectilinear end portions 6a, 6b, upper and lower respectively, joined to each other by a curved portion 6c. As from FIG. 2, the two rectilinear portions 6a, 6b have axes a1 and a2 which are at an angle α to each other. The angle α ranges between 15° and 80°, preferably between 30° and 60°, even more preferably is of about 45°, depending on the overall size of the housing, in order to have the bearing frame 2 and the outdoor termination 3 fully enclosed within the housing H and to have the outdoor termination 3 and the second cable end 4b in a position ready for operation when the bearing frame 2 is raised.

In a preferred embodiment of the invention, the beam 6 is made of steel and has a cross-section designed to maximise the ratio between bending and twisting strength and weight. For example, the beam 6 can be a square tube, or can have T or U shaped cross-section.

The outdoor termination 3 is steadily secured to the upper end portion 6a of the beam 6 and the second end 4b of the electrical cable 4 is mechanically supported to the lower end portion 6b of the beam 6.

Preferably, the electrical cable 4 is secured to the beam 6 in a few points along the beam, in addition to the upper and lower end portions 6a, 6b of the beam 6, by collars 6d or the like.

The bearing frames 2 comprise a hinge 7 rotatable about an axis of rotation X1.

In the present description and in the following claims, by "hinge" it is meant any structural element that forms a constraint which allows the bearing frames 2 to rotate about an axis of rotation.

In the embodiment shown in the annexed figures, hinge 7 is an assembly including a sleeve 7a rotating about a pin 7b supported by the crossbeam 18 of the housing H. The hinge 7 is arranged spaced apart from the beam 6 by the side of the beam concavity.

The hinge 7 is connected to the beam 6 by means of a plurality of struts 8 having first ends 8a connected to the beam 6 and second ends 8b converging towards the axis of rotation X1 and connected to the sleeve 7a of hinge 7.

The bearing frames 2 are rotatable about the axes of rotation X1, X2, X3, respectively. The passage of the bearing frames 2 from the stand-by position to the active position takes place through the rotation of the same about said axes of rotation X1, X2, X3.

In order to carry out the movement of the bearing frames 2, the actuator 5 is active on the bearing frames 2.

The actuator 5 is set up for exerting a direct force along a substantially rectilinear direction that does not intersect the axis of rotation X1, X2, X3 (as the case may be) of the bearing frames 2. In particular, actuator 5 comprises two ends 5a, 5b, respectively hinged to the bearing frame 2 and to a platform 10 of the housing H. In particular, end 5a of the actuator 5, hinged to the bearing frame 2, is arranged near the upper end portion 6a of the beam 6 of the bearing frame 2, close to the outdoor termination 3.

In this way, the force exerted by the actuator 5 causes the rotation of the bearing frame 2 around the hinge 7.

The housing H of the by-pass system 1 further comprises supporting elements 11, 12 on which the bearing frames 2 rest when in the stand-by position. The supporting elements 11, 12 are preferably in the form of bracings or struts, solid with the platform 10 of the housing H, so as to hold and lock firmly the bearing frames 2 and the outdoor termination 3 relative to platform 10 during transportation.

The supporting elements 11 preferably act on the upper end portion 6a of the beam 6 of the bearing frame 2.

Preferably, the supporting elements 12 act on the outdoor termination 3 at the upper end 3a of the same (FIG. 1).

As from FIG. 2, the bearing frames 2 are detached from the supporting elements 11, 12 when the actuators 5 are operated to raise the bearing frames in the operating position.

If convenient, the supporting elements 11, 12 can be removed during the by-pass system operation (and placed again in position for transportation).

Figure 6:
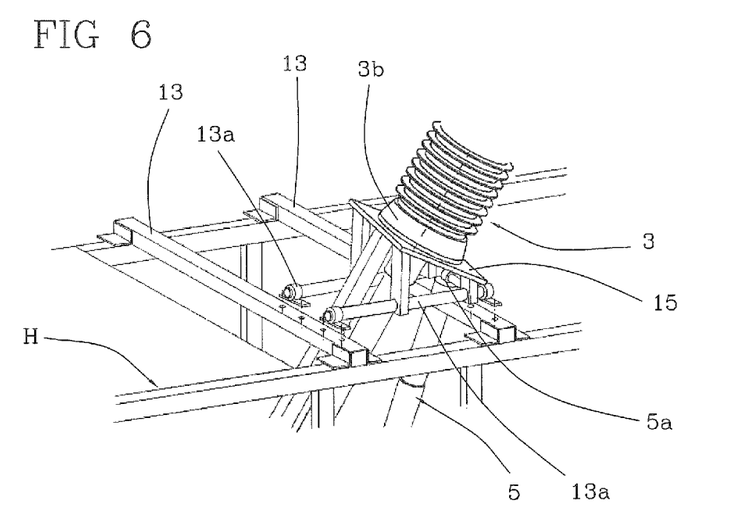
FIG. 6 is a detail of a phase of the movement to locate the termination and bearing frame in operating position.
Figure 7:
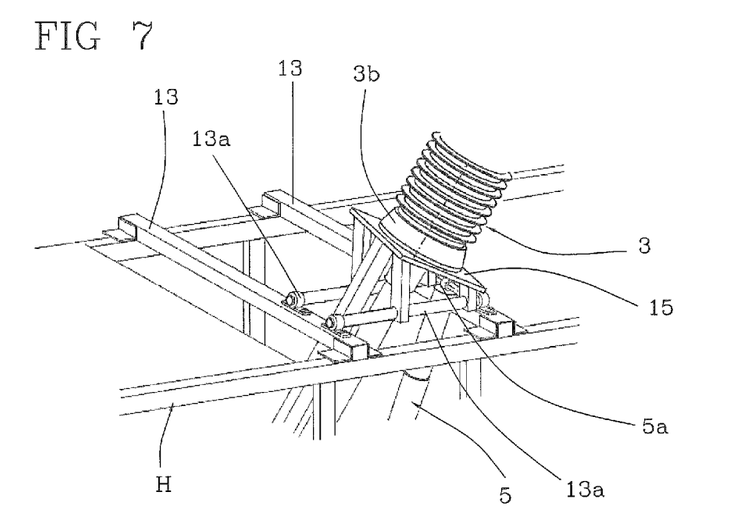
FIG. 7 is a detail showing the termination and bearing frame secured in the operating position.

When a bearing frame 2 is raised in the operating position, as shown in FIGS. 6 and 7, crosspieces 13 are located on the housing H (for example manually) and attached thereto by screws, fasteners or the like.

Conveniently, as shown in FIG. 6, the bearing frame 2 is raised higher than the final operating position, allowing room to insert and secure the crosspieces 13, and thereafter lowered (FIG. 7) to locate the bearings 13a, attached to the baseplate 15, over the crosspieces 13.

When the bearing frame 2 is in its final operating position the bearings 13a can be firmly secured to the crosspieces 13, enabling the actuator 5 to be relieved from the load.

The housing H is conveniently made in the form of a rigid frame extending over the platform 10. Conveniently the housing H has the size of a freight container, so that it can be carried by a truck trailer, or, alternatively, as shown in FIGS. 1-4, it can itself be equipped with a plurality of wheels 14 so as to form a trailer or semitrailer.

The housing H conveniently comprises a platform 10, side walls 16, and a top wall 17. Such walls form a containment case enclosing the bearing frames 2 and the outdoor terminations 3 when the bearing frames 2 are in stand-by position.

Figure 4:
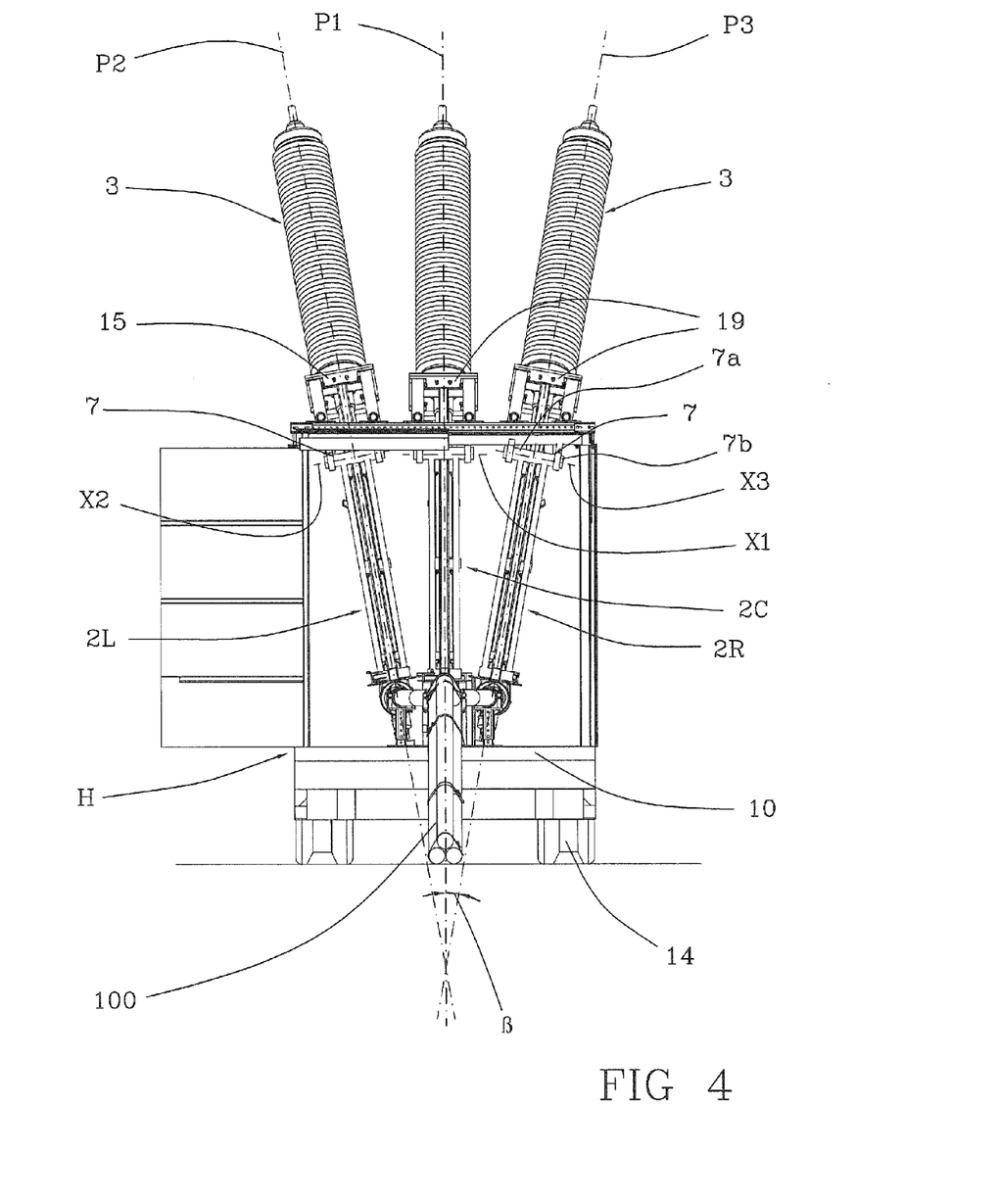
FIG. 4 is a rear view of the by-pass system for overhead power lines of FIG. 2.

The top wall 17 is at least partly movable for forming a top opening, so that the outdoor terminations 3 can protrude out of the housing H when the bearing frames 2 are in the active position, as shown in FIGS. 2 and 4.

Preferably, the side walls 16 are movable too, for allowing easier access to the inside of the apparatus.

In a preferred embodiment of the invention, a by-pass system 1 comprises three outdoor terminations 3 (one for each of the three phases of an overhead power line) to each one of which respective bearing frames 2 are associated. The bearing frames 2 and the other elements of the by-pass system 1 described above and associated to each outdoor termination 3 are substantially identical to each other with the exception of the following.

The bearing frames 2 of each outdoor termination 3 are supported on a crossbeam 18 of the housing H and are rotatable about respective axes of rotation X1, X2, X3 (FIG. 4). Such axes of rotation X1, X2, X3 are not parallel to each other.

In particular, the central bearing frame 2C is supported with rotation axis X1 with substantially horizontal lay, while the left and right bearing frames 2L and 2R, arranged on opposite sides relative to the central one, have axes of rotation X2, X3 inclined in opposite directions. Preferably, the axes of rotation X2, X3 of the left and right bearing frames 2L and 2R are inclined mirror-wise relative to the vertical plane P1 of the central bearing frame 2C.

The inclination of the axes of rotation X2, X3 of the left and right bearing frames 2L and 2R is such that the corresponding planes P2, P3 (FIGS. 3 and 4) perpendicular thereto are diverging upwise, preferably by an angle β with respect to the vertical plane P1 preferably in the range between 2° and 45°, more preferably in the range between 5° and 20°, even more preferably of about 10° (actual value of angle β depending on the size of the outdoor termination 3 and of the housing H).

The central bearing frame 2C and the respective outdoor termination 3 lie in a first substantially vertical plane P1 (FIGS. 3 and 4) and the axis of rotation X1 of the respective bearing frame 2 is perpendicular to the first plane P1.

The left and right bearing frames 2L and 2R and the respective outdoor terminations 3 lie in respective second and third planes P2, P3 (FIGS. 3 and 4) perpendicular to the axes of rotation X2, X3 of the bearing frames 2 and, accordingly, skewed relative to the first plane P1, by the angle β.

In this way, the rotation of the bearing frames 2 of the left and right bearing frames 2L and 2R causes, in addition to the raising of the same, a progressive reciprocal separation between the relevant left and right outdoor terminations and between such terminations and the central termination, allowing the terminations 3 to be kept in close position, so as to have a size suitable for road transportation and to be separated when in operation by an amount sufficient to avoid discharges while connected to the overhead electric network.

Figure 3:
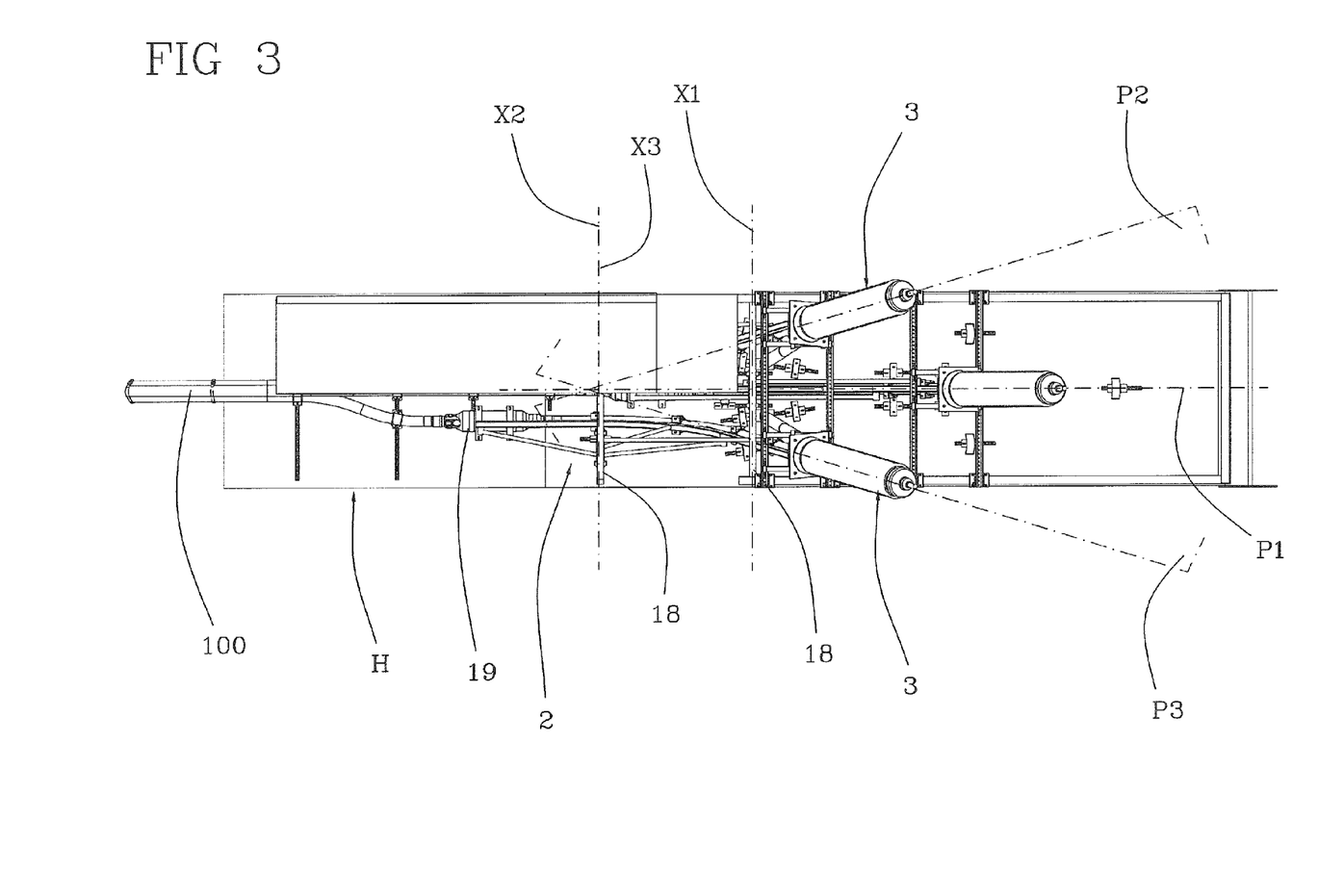
FIG. 3 is a top view of the by-pass system for overhead power lines of FIG. 2.

The second end 4b of the electrical cable 4 is set up for being electrically and mechanically connected to an extension electrical cable 100 (as shown in FIGS. 2 and 3).

Such electrical cable 100 has the function of linking the by-pass system 1, connected to the overhead electric line by one end of the section to be bypassed, to the second end of the section to be bypassed.

In case the second end of the section to be bypassed is an overhead point, the extension cable 100 shall provide the connection from a first by-pass system 1 and a second, similar by-pass system 1 connected to such overhead point.

In case the second end of the section to be bypassed is a point on the ground (or underground), the extension cable 100 shall provide the connection to such point on the ground with a relevant joint.

In order to allow an easy and correct connection of the electrical cable 4 to the extension cable 100, the by-pass system comprises a cable joint 19 for each electrical cable 4 (that is, for each of the three electrical cables 4).

An example of cable joint that may be used is described in document U.S. Pat. No. 5,316,492; cable joints of this type are commercially available, under the trademark CLICK FIT® (for example the model CFJ-CFJX) sold by the Applicant.

Figure 5:
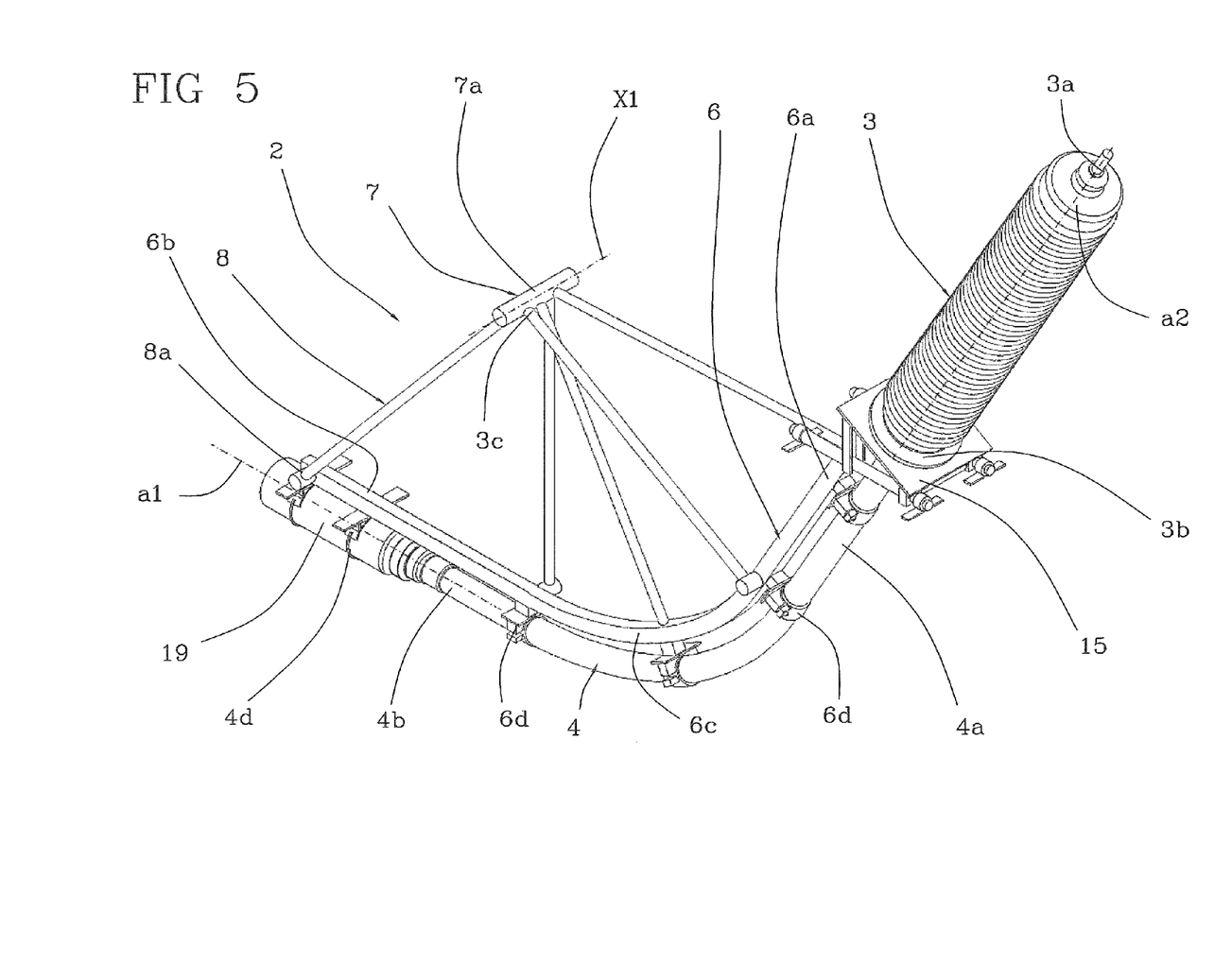
FIG. 5 is a detail of the bearing frame and of the termination and cable attached thereto.

The cable joints 19 are conveniently connected to the relevant bearing frames 2 by means of latches 4*d* or the like (FIG. 5).

The platform 10 comprises one or more holding elements 10*a* for each extension cable 100, to which the extension cable 100 are secured in operation (FIG. 2).

The extension cable 100 can be conveniently transported in the operation place wound on a drum, wherefrom it is unwound during the laying operations of the by-pass system, so as to provide a sufficiently long connection, for example 50 meters, in a limited space (that determined by the drum).

Preferably, a corresponding extension cable 100, wound on a relevant a drum is provided for each outdoor termination 3.

In operation, the three extension cables 100 are preferably laid close each other and latched together in a trefoil arrangement, so as to form a single cord.

Preferably, one end of each extension cables 100 is provided with a connecting connector mating with a respective cable joint 19, and readily insertable thereinto, so as to provide a quick installation.

More preferably, both ends of the extension cables 100 are provided with connecting connectors mating with joints of the same type of the joint 19, in order to speed up the connection phase by both opposite sides of the extension cables 100.

In operation, the by-pass system 1 is transported by a truck trailer or the like in the proximity of the overhead power line where the bypass is to be made.

The housing H is then secured in place with suitable stands 20 or the like and the bearing frames 2 are unlatched from the supporting elements 11, 12 for allowing the bearing frames 2 to be moved.

During these operations, the side and top walls 16, 17 of the housing H are opened, to provide easy access.

The actuators 5 are then operated, so as to rotate the bearing frames 2, preferably one at a time.

The outdoor terminations 3 then emerge from the top opening of the housing H, reaching the condition suitable for the operation.

At that stage, the crosspieces 13 are placed in the relevant positions so as to hold the bearing frames 2 and the outdoor terminations 3 in the reached position.

Subsequent to the rotation of the bearing frames 2, the second end 4*b* of the cable 4 and the joint 19 attached thereto reach a position suitable for being electrically connected to the extension cable 100.

The electrical cables 4 and the extension cables 100 are then mechanically and electrically joined and steadily constrained to platform 10.

Once these operations have ended, the by-pass system is ready to be electrically connected to the electrical line to be by-passed.

The invention claimed is:

1. A by-pass system for overhead power lines, the by-pass system comprising:
   a housing;
   a bearing frame in the housing;
   an outdoor termination linked to the bearing frame; and
   an electrical cable electrically connected to the outdoor termination;
   wherein the bearing frame comprises a beam comprising two substantially rectilinear end portions joined to one another by a curved portion,
   wherein the two substantially rectilinear end portions have respective axes forming an angle greater than or equal to 15° and less than or equal to 80°, and
   wherein the bearing frame is configured to move between a stand-by position of the outdoor termination and an operating position of the outdoor termination.

2. The by-pass system of claim 1, wherein the housing is transportable.

3. The by-pass system of claim 1, wherein the outdoor termination is inside the housing in the stand-by position of the outdoor termination, and
   wherein the outdoor termination extends at least partially outside the housing in the operating position of the outdoor termination.

4. The by-pass system of claim 1, wherein the electrical cable is attached to the bearing frame to move integrally with the outdoor termination between the stand-by position of the outdoor termination and the operating position of the outdoor termination.

5. The by-pass system of claim 4, wherein the bearing frame comprises a beam having a substantially curved shape,
   wherein the outdoor termination is mechanically secured to a first end of the beam, and
   wherein the electrical cable is attached to the beam.

6. The by-pass system of claim 5, wherein the bearing frame further comprises a plurality of struts having first ends connected to the beam and second ends converging toward a hinge forming an axis of rotation of the bearing frame.

7. The by-pass system of claim 1, wherein the bearing frame is configured to rotate within the housing about an axis of rotation for moving from the stand-by position of the outdoor termination to the operating position of the outdoor termination.

8. The by-pass system of claim 7, wherein three bearing frames are housed within the housing, and
   wherein relevant axes of rotation of the three bearing frames are angled with respect to each other in a vertical plane.

9. The by-pass system of claim 1, wherein three bearing frames are housed within the housing.

10. The by-pass system of claim 9, the by-pass system further comprising:
   three actuators, each of the actuators connected to a respective one of the bearing frames;
   three outdoor terminations, each of the outdoor terminations connected to a respective one of the bearing frames, and each of the outdoor terminations configured to be electrically connected to a first by-pass point of a respective one of the overhead power lines; and
   three electrical cables, each of the electrical cables having first and second ends, electrically connected to a respective one of the outdoor terminations at the first end of a respective one of the electrical cables;
   wherein each of the actuators is configured to independently move a respective one of the bearing frames between a stand-by position of the respective outdoor termination and an operating position of the respective outdoor termination, and
   wherein the second end of each of the electrical cables is configured to be electrically connected to a second by-pass point of the respective one of the overhead power lines.

11. The by-pass system of claim 1, wherein at least two bearing frames are spaced lengthwise within the housing.

12. The by-pass system of claim 1, further comprising:
a prefabricated joint connected to an end of the electrical cable opposite to an end of the electrical cable electrically connected to the outdoor termination.

13. The by-pass system of claim 1, further comprising:
an actuator connected to the housing;
wherein the actuator is configured to act on the bearing frame to move the bearing frame between the stand-by position of the outdoor termination and the operating position of the outdoor termination.

14. The by-pass system of claim 13, wherein the actuator is a linear actuator, and
wherein the actuator is configured to operate on an axis not intersecting an axis of rotation of the bearing frame.

15. A method for operating a by-pass of a section of an electric line having an overhead end, the method comprising:
providing a by-pass system including a bearing frame housed in a housing, with an outdoor termination linked to the bearing frame and an electrical cable, having first and second ends, electrically connected to the outdoor termination at a first end of the outdoor termination;
disposing the by-pass system in proximity of the section of the electric line, while the bearing frame is in a stand-by position of the outdoor termination;
raising the bearing frame from the stand-by position of the outdoor termination to an operating position of the outdoor termination; and
electrically connecting a second end of the outdoor termination to the overhead end of the section of the electric line;
wherein the bearing frame comprises a beam comprising two substantially rectilinear end portions joined to one another by a curved portion, and
wherein the two substantially rectilinear end portions have respective axes forming an angle greater than or equal to 15° and less than or equal to 80°.

16. The method of claim 15, further comprising:
providing a prefabricated joint attached to the electrical cable so that the first end of the electrical cable is electrically connected to the outdoor termination, and the second end of the electrical cable is electrically connected to the prefabricated joint; and
electrically connecting the prefabricated joint to an end of the section of the electric line opposite to the overhead end.

17. A by-pass system for overhead power lines, the by-pass system comprising:
a housing;
three bearing frames connected to the housing;
three actuators, each of the actuators connected to a respective one of the bearing frames;
three outdoor terminations, each of the outdoor terminations connected to a respective one of the bearing frames, and each of the outdoor terminations configured to be electrically connected to a first by-pass point of a respective one of the overhead power lines; and
three electrical cables, each of the electrical cables having first and second ends, electrically connected to the outdoor termination at the first end of a respective one of the electrical cables;
wherein each of the actuators is configured to independently move a respective one of the bearing frames between a stand-by position of the respective outdoor termination and an operating position of the respective outdoor termination,
wherein the second end of each of the electrical cables is configured to be electrically connected to a second by-pass point of the respective one of the overhead power lines,
wherein each of the bearing frames comprises a beam comprising two substantially rectilinear end portions joined to one another by a curved portion, and
wherein the two substantially rectilinear end portions have respective axes forming an angle greater than or equal to 15° and less than or equal to 80°.

* * * * *